Patented Aug. 30, 1938

2,128,702

UNITED STATES PATENT OFFICE 2,128,702

GLAZING GLASS

Frederick Gelstharp, Tarentum, Pa., assignor to Pittsburgh Plate Glass Company, Allegheny County, Pa., a corporation of Pennsylvania No Drawing. Application June 16, 1936, Serial No. 85,529

1 Claim. (Cl. 106—36.1)

The invention relates to glazing glass which is substantially colorless and suitable for use in double windows in which two sheets are used in parallel with an insulating space therebetween. When ordinary plate or window glass is used for this purpose, a white alkaline dust forms on the inner faces of the glass sheets in the course of time, and since these faces are not readily accessible for cleaning, the appearance of the window and its transparency are noticeably impaired. This characteristic incident to ordinary glass is known as "bloom" or "efflorescence". The object of the present invention is to provide a glass which has the characteristic hardness, clearness, and strength of ordinary plate or window glass and which can be produced at a reasonable cost, but which is free from efflorescence or bloom. I have found that this result may be accomplished by reducing the sodium oxide content of a high silica glass below a certain point which I have determined, the deficiency in soda ash in the batch used to secure this reduction, being supplied by the use of a potassium compound, such as the carbonate or nitrate, so that the alkali content of the batch approximates that of ordinary plate or window glass. This gives a glass which is comparable with ordinary plate and window glass as to conditions required for melting and one which has the same physical characteristics except as to the freedom from bloom or efflorescence.

A typical glass formula which may be satisfactorily used to make the glass sheets is as follows:

*Batch formula*

| | Parts |
|---|---|
| Sand | 1000 |
| Soda ash | 149 |
| Potassium nitrate | 230 |
| Calcium carbonate | 350 |
| Salt cake | 10 |
| Common salt | 25 |
| Antimony oxide | 15 |

*Glass Composition*

| | Per cent |
|---|---|
| $SiO_2$ | 69.8 |
| $Na_2O$ | 6.5 |
| $K_2O$ | 7.5 |
| $CaO$ | 13.5 |
| $Na_2SO_4$ | .8 |
| $NaCl$ | .8 |
| $Sb_2O_5$ | 1.0 |
| Alumina and iron oxides | .1 |

The potassium nitrate in the foregoing batch may be replaced in part by potassium carbonate if desired to give the desired potassium oxide content in the glass produced, in which case, the calcium carbonate content of the batch will be correspondingly reduced in order to maintain the percentage of calcium oxide in the glass approximately the same.

It will be noted that the amount of potassium oxide in the glass is in excess of the sodium oxide, and that the sodium oxide is not in excess of 6.5 per cent of the total weight of the glass. I have found that with these proportions, the glass loses all tendency to bloom or effloresce, but that with a greater proportion of sodium oxide, the tendency to "bloom" begins and increases progressively with the increase in sodium oxide. The amount of sodium oxide may be decreased one or two per cent below the example given with a corresponding increase in the potassium oxide content without adversely affecting the product, but it is preferred to hold the amount of sodium oxide at about the 6.5 per cent proportion, rather than to decrease it, as the cost of the ingredients required to give the sodium oxide content is less than those required to produce the potassium oxide content.

The calcium oxide content may be replaced by oxides of barium, magnesium zinc or lead, but this means a glass of higher cost, so that a so-called lime soda glass is preferred, i. e., one in which the proportion of lime to soda is not less than 1 to 2. A high silica content is also desirable because of the lower cost and superior strength and hardness incident to this content. By "high silica glass" is meant a glass containing at least 50 per cent of $SiO_2$. The term "sheet glass" is used in its broad sense to mean glass in sheet form suitable for glazing such as window glass which has a fire polish and plate glass which has its surfaces ground and polished.

What I claim is:

A lime soda, high silica, substantially colorless and non-blooming sheet of glass comprising approximately 70 per cent of silicon dioxide, 7.5 per cent of potassium oxide, 15 per cent of calcium oxide, 1.1 per cent of antimony oxide, 0.1 per cent of aluminum and iron oxides and with a sodium oxide content of not more than 6.5 per cent by weight of the weight of the glass.

FREDERICK GELSTHARP.